United States Patent [19]

Gibbs

[11] Patent Number: 5,011,002
[45] Date of Patent: Apr. 30, 1991

[54] SCRAPER APPARATUS FOR CONVEYOR BELTS

[75] Inventor: A. Todd Gibbs, Allentown, Pa.

[73] Assignee: ASGCO Manufacturing, Inc., Allentown, Pa.

[21] Appl. No.: 557,642

[22] Filed: Jul. 25, 1990

Related U.S. Application Data

[63] Continuation-in-part of Ser. No. 457,112, Dec. 26, 1989.

[51] Int. Cl.⁵ .............................................. B65G 45/00
[52] U.S. Cl. ..................................... 198/497; 198/499
[58] Field of Search ............... 198/497, 499; 15/256.5, 15/256.51, 256.6

[56] References Cited

U.S. PATENT DOCUMENTS

| | | | |
|---|---|---|---|
| 3,674,131 | 4/1974 | Matson | 198/230 |
| 4,344,525 | 8/1982 | Bancroft et al. | 198/499 |
| 4,359,150 | 11/1982 | Bowman et al. | 198/497 |
| 4,365,706 | 12/1982 | Bright | 198/499 |
| 4,658,949 | 4/1987 | Reicks | 198/497 |
| 4,694,952 | 9/1987 | Meijer | 198/499 |
| 4,696,389 | 9/1987 | Schwarze | 198/499 |
| 4,754,868 | 7/1988 | Hughes et al. | 198/499 |
| 4,768,644 | 9/1988 | Cromm | 198/499 |
| 4,779,716 | 10/1988 | Gordon | 198/497 |

OTHER PUBLICATIONS

"Durt Hawg In-Line", Martin Engineering Co. (date unknown).

Primary Examiner—Joseph E. Valenza
Attorney, Agent, or Firm—Dann, Dorfman, Herrell and Skillman

[57] ABSTRACT

A trailing arm scraper assembly for a conveyor belt having an arm extending generally in the direction or normal travel of the belt, and a scraper blade mounted at one end of said trailing arm in a home position having a scraping edge forcibly engaging said belt surface. A blade-mounting block at the end of the arm has a stud element releasably mounting said scraper blade for replacement, and affording pivotal movement of said blade about a blade axis substantially parallel to its scraping edge. The scraper blade has resilient abutments to engage the blade-mounting block to yieldingly resist pivotal movement of said blade away from its home position upon encountering an obstruction on the belt surface as it travels past the blade, and to return said blade to its home position upon travel of the obstruction beyond the blade. The abutments allow greater pivotal movement when obstructions are carried by the belt traveling in a direction reverse to its normal travel. The blade is designed to wear away to provide fresh scraping edges conforming to the contour of the belt. A blade is shown with a uniform width for a set distance from the original scraping edge, and narrowing width beyond the set distance, so that excessive wear is indicated by a narrowing of the swath scraped by the blade.

21 Claims, 5 Drawing Sheets

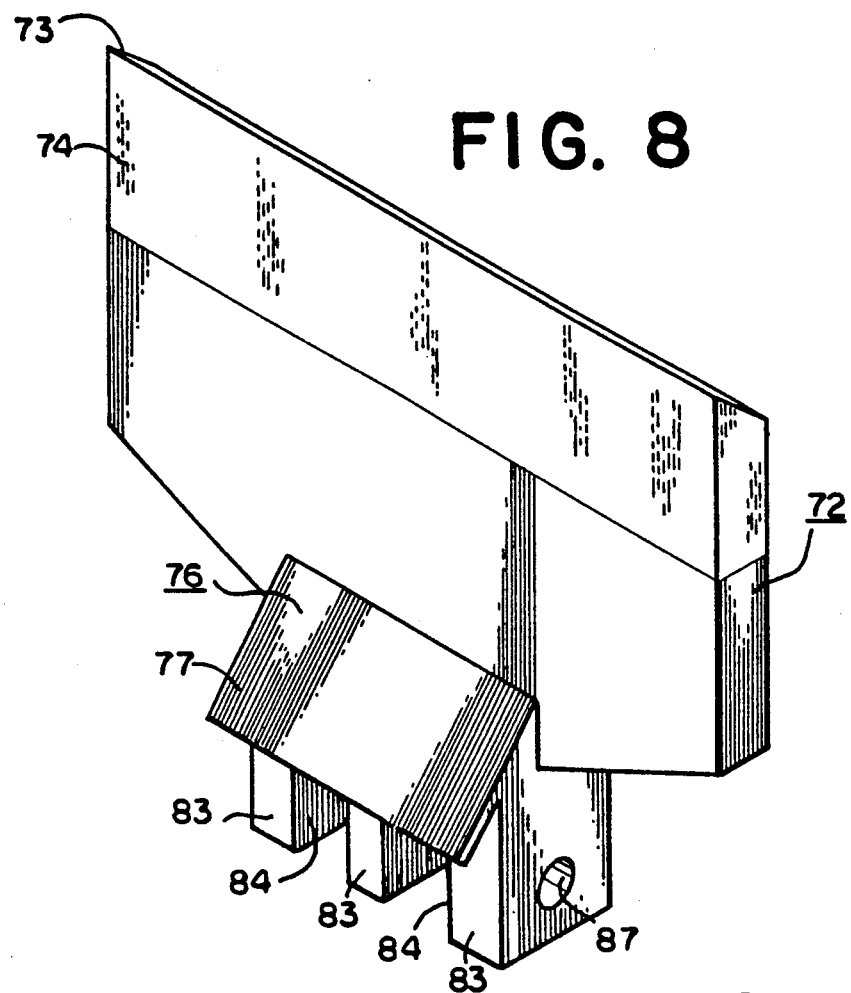
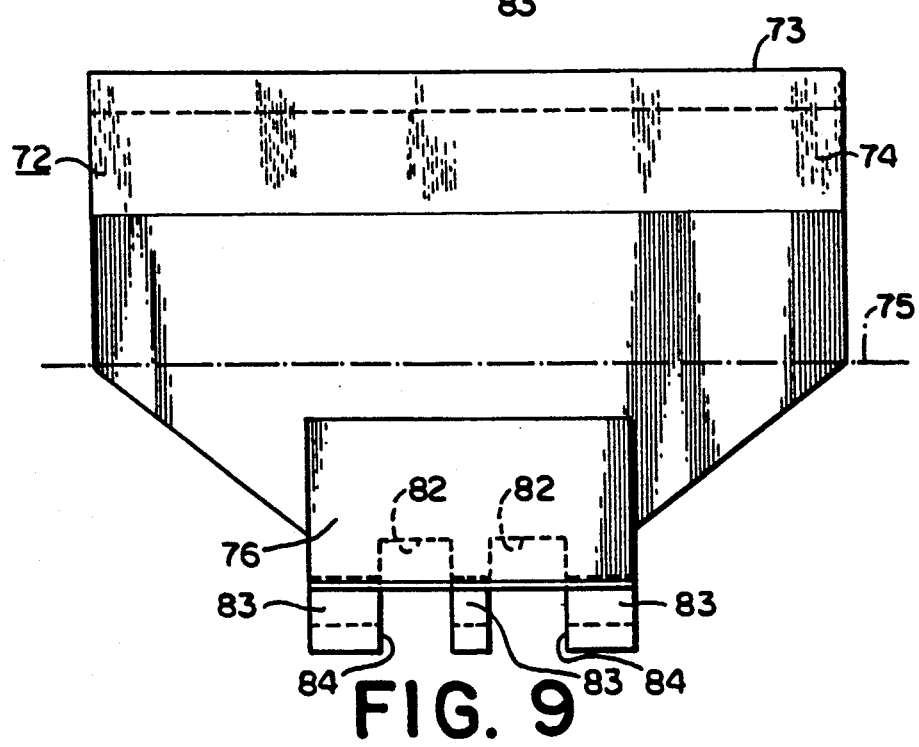

SCRAPER APPARATUS FOR CONVEYOR BELTS

RELATED APPLICATION

This case is a continuation-in-part of my pending application Ser. No. 07/457,112 filed Dec. 26, 1989.

FIELD OF THE INVENTION

The present invention relates to belt scrapers for conveyor belts, and has particular application to trailing-arm scrapers used in quarries and mining operations where the scraper is positioned to remove debris which may cling to the return run of an endless conveyor belt.

BACKGROUND OF THE INVENTION

In most of such conveyor installations, a secondary belt-cleaning function is performed as the belt leaves the head pulley in its return run. The secondary cleaning function is performed by a trailing-arm scraper which is pivotally mounted below the head pulley and has arms extending generally parallel to the return run for mounting scraper blades which are biased against the return run of the belt to remove debris which is not removed in the primary discharge operation on the head pulley. The trailing-arm arrangement for the secondary scraper permits splices or other obstructions projecting from the conveyor belt to displace the scraper away from the belt as the belt carries the obstructions into the path of movement of the blade. The trailing-arm scrapers are conventionally segmented, with each segment separately biased so that displacement of one segment may occur without losing the cleaning effect of the other segments.

In many prior scraper assemblies, the arm and blade were designed to allow pivotal movement or twisting of the blade about an axis perpendicular to the blade surface and parallel to the line of travel of the conveyor belt so that pivotal movement of the blade would cant the scraping edge for the apparent purpose of allowing the scraping edge to follow tilting movement of the moving belt. It has been found, however, that obstructions may also cant scraping edge of the belt, which is likely to detract from the operation of the scraping assembly and may cause the corners of the scraping edge to dig into the belt and cause premature wear.

My co-pending application, Ser. No. 07/457,112 filed Dec. 26, 1989, discloses an improved mounting arrangement for trailing-arm scrapers which facilitates installation removal and replacement of the scraper blades as they become worn or damaged in use. Prior to the invention, the most common mode for replacement of the worn blade was to replace the entire arm and blade assembly. In this mounting, the blade is firmly secured to the blade arm by a releasable connection, so that the blade assembly may be refurbished by mounting a replacement blade on the existing arm after it is removed from its operating position. While this mounting arrangement has proved helpful in solving the most common problems of trailing-arm scrapers, it has been found that in many installations, there are problems which arise when belt travel is reversed.

In normal conveyor installations, there are safety mechanisms to prevent belt reversal when power is removed from the driving pulleys, but in use, such safety devices become ineffective and frequently in older installations, particularly where the belt is used to convey material up an incline, when the belt is arrested, the conditions cause the belt to reverse its travel. When the belt is reversed, the trailing-arm scraper blades tend to dig into the belt and distort the belt, and when the reverse travel is severe and the belt has foreign objects projecting from it, the reverse travel of the belt causes the scraper blades to dig into the belt and damage the belt and sometimes damage the entire scraper blade assembly beyond repair.

U.S. Pat. No. 4,696,389 illustrates a mechanism which pivots the scraper arm away from the belt during reversal of the belt, and U.S. Pat. No. 4,344,525 illustrates a scraper device having shear pins which break to avoid damage to the scraper device or the belt. Other mechanisms have been provided which respond to the reversal of the belt to displace the scraper blade away from the belt when the belt is driven in the opposite direction. Such mechanisms have not been entirely satisfactory because of the modifications which must be made in the conveyor drive, or else because of the expense of the modified scraper assembly.

SUMMARY OF THE INVENTION

The present invention provides a simple modification of the scraper blade which permits the blade to accommodate belt reversal without causing damage to the belt or the scraper blade.

The scraper blade of the present invention enables the blade to be pivoted away from its normal scraping angle by abnormal reversal of the belt and to automatically return to its normal scraping angle upon resumption of normal travel of the belt.

The improved scraper blade of the present invention also provides means for facilitating observation of scraper wear or damage, and signaling the need for scraper blade replacement.

Another object of the invention is to provide an improved replaceable mounting for a scraper blade on a mounting arm in which the mounting device restricts pivotal movement of the blade about the axis of the mounting arm, but affords pivotal movement of the blade about an axis transverse to the mounting arm axis and parallel to the scraping edge of the blade.

More specifically, the present invention provides a scraper blade for mounting on a trailing arm having a connection with the trailing arm affording pivotal movement about an axis parallel to the scraping edge and means to bias the blade against pivotal movement away from a position providing the desired attack angle for engaging the conveyor belt.

More specifically, the present invention provides a pivoted connection between the scraper arm and the scraper blade embodying elastomeric material tending to position the blade at the proper angle of attack, but affording forceful pivotal displacement of the blade upon encountering obstructions on the belt which would otherwise cause damage to the belt, the blade, or its mounting.

All of the objects of the invention are more fully set forth hereinafter with reference to the accompanying drawings, wherein:

FIG. 5 is a fragmentary sectional view taken on the line 5—5 of FIG. 1;

FIG. 8 is a perspective view of the scraper blade;

FIG. 9 is a face view of the scraper blade shown in FIGS. 6 and 8.

DESCRIPTION OF THE PREFERRED EMBODIMENTS

Figure 1:
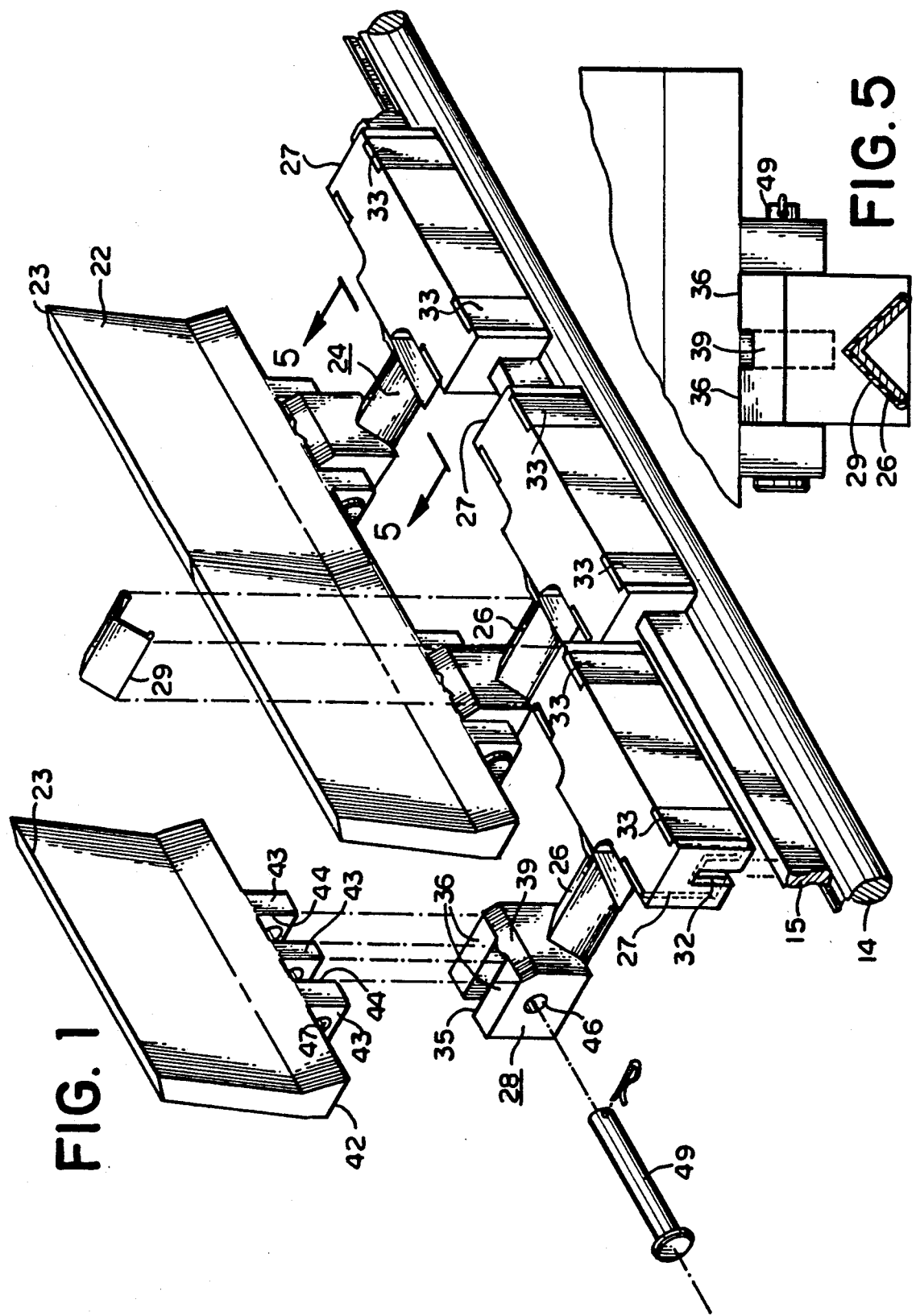
FIG. 1 is a perspective view, partially exploded, showing a trailing-arm scraper blade assembly embodying the present invention.
Figure 2:
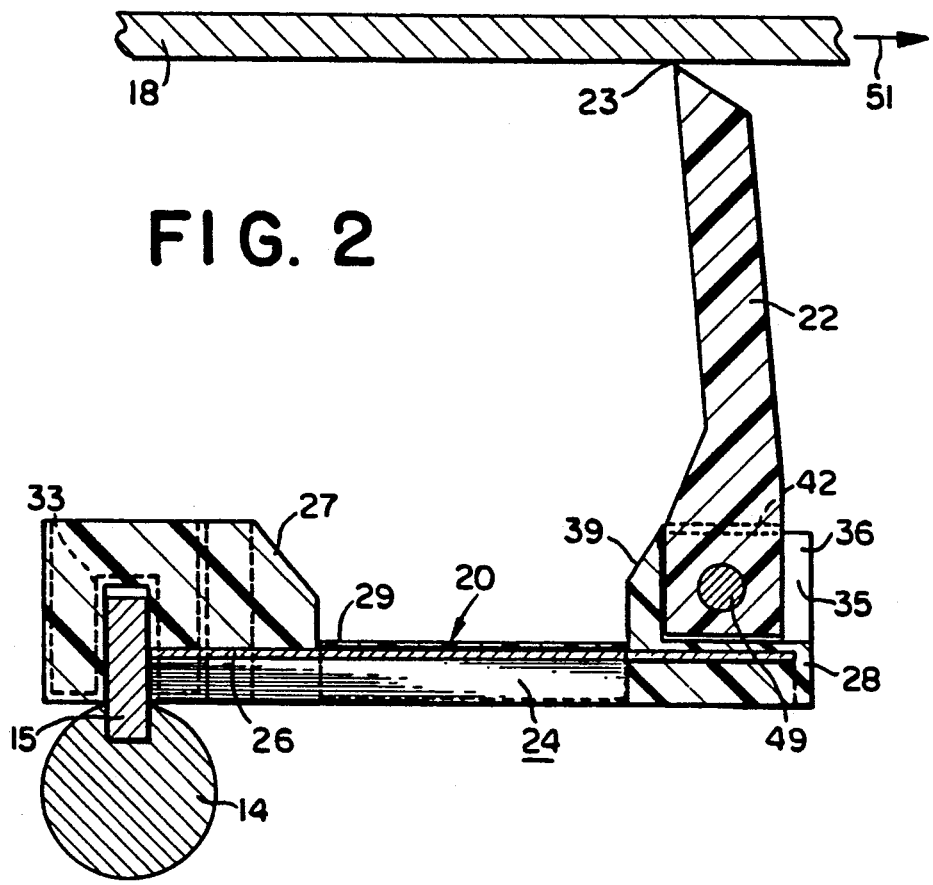
FIG. 2 is a sectional view longitudinally of the scraper arm illustrating the normal attack angle of the scraper blade with the conveyor belt.

Referring now to the drawing, and more particularly to the embodiment of the invention illustrated in FIGS. 1-5 inclusive, the scraper assembly is adapted to be mounted on a mounting tube 14 having an upstanding rib 15 extending transversely to the return run 18 of a conveyor belt generally parallel thereto (see FIG. 2).

A plurality of hanging trailing arm assemblies 20 are adapted to be mounted side-by-side on the tube 14 and are arranged to dispose each scraper blade 22 in forceful engagement with the underside of the conveyor belt 18. Preferably, the blades 22 are disposed contiguously side-by-side to provide a continuous scraping edge 23 at their upper end. As shown, the blades 22 are each mounted at the distal end of a trailing arm 24.

As shown in FIG. 1, the trailing arms 24 are equal in length to one another so as to position the blades 22 in side-by-side contiguous alignment. However, in other installations it may be preferred to stagger the blades 22 so as to enable the use of wider blades which are designed to clear overlapping swaths on the undersurface of the conveyor belt 18. Side-by-side contiguous alignment of the blades 22 is desirable to provide guidance tending to maintain each blade 22 generally parallel to the conveyor surface as it is biased against the surface by the upward bias on the trailing arm 24. The mounting tube 14 and rib 15 is biased counterclockwise as shown in FIG. 2 to forcibly engage the scraping edge 23 of the blade 22 with the undersurface of the conveyor belt 18.

As shown, the trailing arm 24 of the assembly 20 comprises a rigid strut 26 embedded into a hanger element 27 at its mounting end and carrying a blade-mounting block 28 at its distal end. The hanger 27 comprises a block of elastomeric material, such as urethane having a durometer in the range of 80-90 Shore A. The underside of the block is provided with an inverted U-shaped channel 32 designed to fit over the rib 15 and releasably anchor the hanger on the shaft 14 of the mounting tube. Spaced inwardly from each end of the hanger is an inverted U-shaped extrusion 33 of rigid material which is spaced inwardly from the opposite ends of the hanger block and between which the rigid strut 26 is anchored.

As shown in FIG. 2, the rigid strut 26 terminates at its inner end so as to bear against the rib 15. The extrusion inserts 33 slidably engage the rib so as to stabilize the hanger block 27 on the rib. The urethane block 27 of the hanger resiliently interconnects the strut 26 with the rigid extrusions 33 to yieldingly resist displacement of the strut 26 relative to the rib 15. By spacing the rigid extrusions inwardly from the end edges of the anchor block 27, the sharp corners of the extrusions 33 are embedded within the urethane block so as to reduce the likelihood of damage caused by the extrusions when the hanger elements are displaced from the rib 15, as described hereinbelow. Although the strut 26 is fabricated of stainless steel, as further protection, the strut 26 is covered with a snap-on plastic cover 29 which may protect the rigid strut against corrosive material being scraped from the conveyor belt 18 as well as covering the sharp corner angle between the legs of the angular strut.

When the mounting tube 14 is biased counterclockwise in FIG. 2, the extrusions 33 interlock with the rib 15 so as to forcibly bias the blade 22 upwardly against the undersurface of the belt 18. When it is desired to disassemble the scraper assembly from the mounting tube 14, the mounting tube is simply rotated clockwise as in FIG. 2 until the rib 15 is positioned to allow the hanger block 27 to fall from the rib by gravity. The scraper arm may fall into a collector, and the elastomeric nature of the hanger block reduces the likelihood of damage caused by the falling assembly.

The elastomeric connection between the hanger extrusions 33 and the strut 26 reinforces the upward bias applied to the scraper blade in operation. The yielding nature of the elastomeric material allows each scraper blade to be displaced downwardly against the resistance of the urethane to accommodate minor variations in the belt surface, such as those caused by the normal splices and the like.

In order to assure proper positioning of the scraper assembly on the mounting shaft 14, set screws (not shown) may be used to anchor the hanger assembly, either positively or only against longitudinal movement along the rib. Preventing movement of the trailing arm 24 along the rib positions the scraping edge of the blade against the desired area of the conveyor belt. Such anchoring is particularly desirable in those installations where the scraper blades are staggered rather than being positioned contiguously in endwise alignment.

Figure 3:
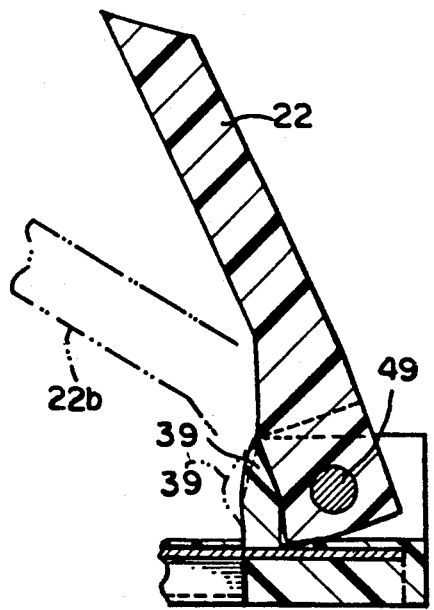
FIG. 3 is fragmentary view similar to FIG. 2 showing in full lines displacement of the scraper blade resulting from belt reversal and in broken lines the limit of such displacement.
Figure 4:
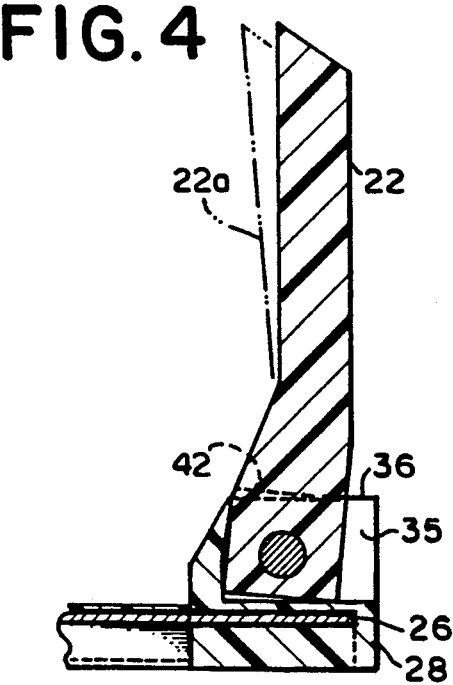
FIG. 4 is a view similar to FIG. 3 showing in full lines usual displacement of the blade which may occur upon encountering foreign objects on a forwardly-traveling belt and in broken lines the normal position of the blade.

The blade-mounting block 28 at the distal end of the trailing arm 24 is also formed of a tough elastomeric material, in the present instance a urethane having a hardness or resiliency range of 80-90 durometer Shore A. As shown in FIG. 1, the block has a rectangular or cubicle outline and has a central slot 35 formed to overlie the distal end of the strut 26 and to provide on opposite sides of the slot generally rectangular knuckles 36,36. Towards the hanger, the slot 35 is closed by a web portion 39 which bridges the knuckles 36,36. As shown in FIGS. 2-4, the web portion 39 of the mounting block 28 has a tapered upper end which facilitates distortion of the web element 39, allowing counterclockwise angular displacement of the blade 22 as described below.

The web 39 provides an exposed surface confronting the blade 22 where it penetrates between the knuckles 36,36. The knuckles 36,36 on their upper exposed surface are generally flat and parallel to the strut 26 so as to provide a resilient abutment surface confronting the undersurface of the blade 22 at its base edge.

The blade 22 has a configuration to mate with the knuckles 36,36 and the slot 35 therebetween. To this end, the base edge 42 of the blade 22, which is opposite to and parallel to the scraping edge 23, has a flat undersurface adapted to confront and register with the flat upper surfaces of the knuckles 36. Depending below the edge surface 42 are a series of knuckles 43 providing therebetween slots 44 which are dimensioned to complement the knuckles 36. The central knuckle 43 is likewise complementary to the slot 35 of the mounting block 28. The knuckles 43 and 36 may then be interdigitated as shown in FIGS. 2–4, and through-bores 46 and 47 are provided in the knuckles 36 in the knuckles 43 respectively so that upon alignment, the bores 46 and 47 provide a socket for receiving the shank of a stud 49 which serves to interconnect the blade 22 with the block 28. The hollow cylindrical nature of the socket provided by the bores 46 and 47 permits limited pivotal movement of the blade 22 in the mounting block 28, the movement being yieldingly resisted in the clockwise direction as seen in FIGS. 2–4 by the abutment of the surface 42 at the base of the blade with the flat upper surfaces of the knuckles 36. Counterclockwise pivotal movement of the blade on the stud 49 is likewise yieldingly resisted by the elastomeric nature of the web 39 which may be resiliently distorted as shown in FIG. 3 when the blade 22 is pivoted counterclockwise on the stud 49. Greater resistance to the pivotal displacement of the blade may be achieved by increasing the durometer of the elastomeric material in the block 28 or the blade 22, and may be reduced by reducing the durometer of the elastomeric material.

As shown in FIGS. 2–4 inclusive, when the belt 28 is traveling in its normal direction as indicated by the arrow 51 in FIG. 2, the scraping edge 23 of the blade serves to clear a swath on the underside of the belt. The counterclockwise bias provided by the shaft 14 and the resilient mounting of the strut 26 in the hanger 27 resiliently maintains the blade edge 23 forcefully engaged with the undersurface of the belt, but permits displacement of the scraping edge to afford passage of splices or other minor obstructions on the belt's surface.

Larger obstructions carried by the belt 18 tend to displace the blade 22 clockwise, for example to the position shown in FIG. 4, changing the angle of attack of the leading surface of the blade 22 in the range of 0°–10° from the normal attack angle shown in broken lines at 22a, so that the force of the obstruction enables the arm 24 to be displaced clockwise against its bias so as to afford passage of the larger obstructions. The resilience within the scraper arm assembly itself permits the single scraper blade to be displaced without displacing the remaining scraper blades. If the resilient mounting of the arm and the blade does not permit passage of the obstruction, clockwise displacement of the shaft against its bias allows the blades across the full width of the scraper assembly to disengage the belt.

Under certain extraordinary operating conditions, obstructions on the belt may be sufficiently large to displace the blade 22 clockwise a distance to cause the edge surface 42 to travel beyond the trailing edge of the upper surface of the knuckles 36, thereby allowing the blade to "flip" over the rearward corner of the knuckles and extend generally parallel to the arm 24. Once pivoted over the corner, the blade does not automatically revert to its normal operating position, and a swath in the path of the "flipped" blade will not be cleared and will provide a visible indication of the extraordinary operating condition, allowing the condition to be corrected and the blade to be manually returned to its normal operating condition. The resistance to such "flipping" is determined by the hardness of the elastomeric material of the edge 42 and the confronting surface of the knuckles 36.

Particularly in quarry operations, it is not an uncommon occurrence that upon stoppage of the conveyor, the conveyor belt travels in the reverse direction for several feet or more, for example when the normal stop or brake mechanism is worn or inoperative, or when the operating conditions permit the belt to slide over the drive pulleys. Prior to the present invention, belt reversal tended to cause damage to the scraper assembly, either damaging the scraper blade, the trailing arm, or the conveyor belt, or all of these. The present invention enables the scraper blade to be displaced counterclockwise as seen in FIGS. 2–4 when the belt reverses travel and carries an obstruction in the reverse direction against the backside of the scraper blade. As shown in FIG. 3, the presence of an obstruction on the reversely-traveling belt causes the blade 22 to pivot counterclockwise about the axis of the stud 49, by reason of distortion of the web 39 between the knuckles 36. For minor obstructions, a counterclockwise displacement on the order of 20° may be sufficient to permit passage of the obstruction without damage to the belt or the scraper blade. The flexible resilient nature of the web 39 permits even larger obstructions to pass the scraper arm assembly without damage by allowing the blade 22 to pivot counterclockwise as much as 60°, as shown in broken lines at 22b in FIG. 3.

The material composing the blade and the mounting block and the knuckles thereof, allows a yielding resistance to the pivotal movement of the blade and effects return movement of the blade to its normal home position with the desired angle of attack to the conveyor belt as shown in FIG. 2 by reason of the resilient nature of the elastomeric material.

The yielding resistance to pivotal movement of the blade enables the scraper arm assembly to be maintained in operation for a considerable period of time without damage by reason of reversal of the conveyor belt. This is accomplished without the need for special mechanism to sense belt reversal or to actuate the support shaft 14 when belt reversal occurs.

The resiliency built into the scraper arm assembly permits individual scraper blades to respond to obstructions on the belt without losing the effectiveness of the remaining scraper blades to clearing the other areas of the belt.

FIGS. 6–12 inclusive illustrate an alternate embodiment of the present invention which has certain features in addition of those described above in connection with FIGS. 1-6. The trailing arm 24 and the support shaft 14 with its upstanding rib 15 are identical to those elements described above in connection with FIGS. 1–5, but in this case the protective cover 29 for the strut 26 is omitted for the ease of illustration.

As in the previous embodiment, the mounting block 28 provides a pair of knuckles 36 with a slot therebetween which is bridged by a web element 39 at the side of the block confronting the hanger 27. A blade 72 is mounted in the mounting block 28 so as to be positioned at a desired attack angle to the conveyor belt, as shown in full lines in FIG. 6. At its upper end, the edge of the blade 72 is beveled to provide a scraping edge 73 along the top of the leading or forward surface of the blade. The upper margin 74 of the blade has ceramic or other abrasion-resistant particles embedded into the elastomeric material to enhance the wear resistance of the blade and to achieve improved scraping action for selected conditions of operation of the conveyor.

Figure 6:
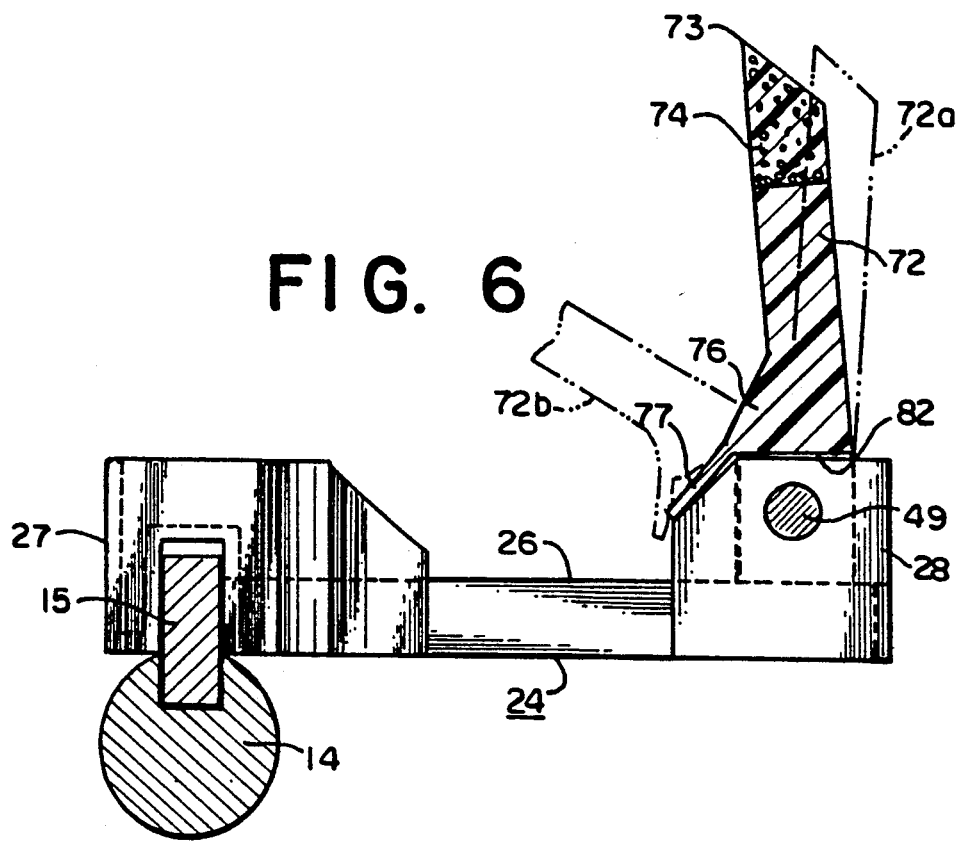
FIG. 6 is a side view longitudinally of the scraper arm of a second embodiment of scraper blade embodying the present invention with the blade in section, showing in broken lines limits of resilient displacement which may occur upon encountering foreign objects on a forwardly-and-reversely-traveling belt, respectively.
Figure 7:
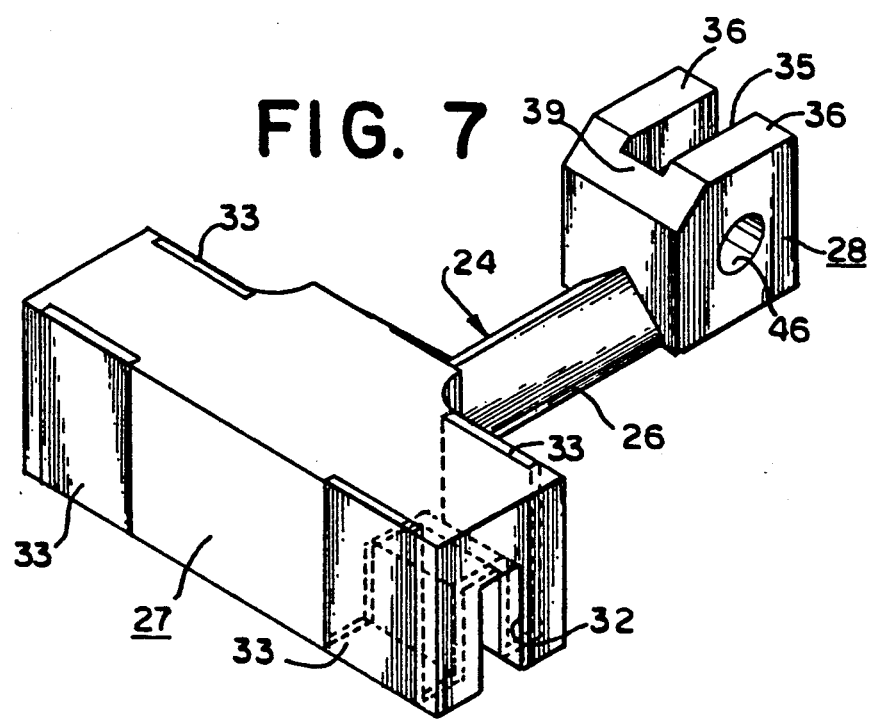
FIG. 7 is a perspective view of the trailing arm.

As shown in FIG. 6, the blade is of uniform thickness in the upper part below the upper margin 74 for a predetermined distance below the scraping edge 73, to an imaginary dividing line indicated by the broken line 75 in FIG. 9. The lower marginal portion of the blade 72 narrows in width below the dividing line 75 and a mounting pedestal 76 is provided at the base of the blade 72. The forwardly-directed surface of the pedestal 76 slants downwardly and terminates in a projecting flap 77 which projects from the leading surface and overlies the knuckles 36 and slot 35 of the blade-mounting block 28. The pedestal 76 provides a series of downwardly-projecting knuckles 83 forming between them slots 84 which are complementary to the knuckles 36 of the mounting block. As shown in FIG. 6, the undersurface 82 of the pedestal between the knuckles 83 provides a flat abutment surface which mates with the flat upper surface of the knuckles 36. The knuckles 83 are provided with registering through-bores 87 which serve as a socket for receiving the mounting stud 49. As with the previously described embodiment, the abutment surface 82 on the blade 72 yieldingly resists pivotal movement of the blade in a clockwise direction as shown in FIG. 6, affording normal rearward pivotal displacement of the scraping edge in the range of 0°-10°. Counterclockwise pivotal movement is yieldingly resisted by resilient distortion of the web 39 under the flap 77. The hardness or resilience of the web 39 is selected to allow counterclockwise pivotal movement of the scraping edge in the range of 10°-60° as indicated by the broken line 72b in FIG. 6, and the hardness of the undersurface 82 of the blade and the confronting surfaces of the knuckles 36 is selected to allow "flipping" of the blade under extraordinary conditions, as described above.

The blade configuration shown in FIGS. 6-11 is designed to provide an indication when blade wear has occurred to an extent to require blade replacement. As noted, the scraper blades of the present invention are designed to wear away under continued use. As the blade wears away, new scraping edges are formed as the bias on the trailing arm displaces the blade toward the belt to accommodate the wear. When it is desired to replace the blades, the support shaft 14 may be rotated clockwise until the rib 15 declines downwardly. The clockwise rotation of the shaft 14 releases the clamping engagement of the rib 14 in the channel 32 and when the rib is positioned with downward declination, the trailing arm 42 may simply fall from the rib 15 by gravity. The arms displaced from the mounting shaft 14 in this fashion may then be collected and the worn blades may be replaced by simply removing the studs 49 and replacing the worn blades with a fresh blade.

In a quarry environment, it is not an uncommon occurrence that blade replacement is neglected. The trailing arm scrapers are disposed underneath the conveyor and are not readily visible. Particularly, if one of the series of endwise-aligned blades is damaged or worn more than others, the bias on the trailing arm may cause the trailing arm to engage the belt and either damage the belt or damage the blade-mounting block at the end of the trailing arm. The present invention provides a visual indicator to indicate that the blade has become worn to a point which requires replacement. In the present case, this indication is provided by the configuration of the blade where its width at the scraping edge is uniform for a predetermined distance to the line 75 and thereafter narrows as it approaches the socket provided by the bores 87. The narrowing of the blade beyond the predetermined distance 75 reduces the cleaning swath provided by the scraping edge 73 of the blade and leaves a telltale stripe of uncleaned belt which serves as a warning to the operator to replace the blades. The stripe appears before the blades are worn down to the pedestal 76 and the cleaning of the belt is not substantially reduced until the blade is worn down to the point beyond the pedestal 76. The line 75 is spaced from the pedestal 76 so that there is a second distance which must be worn away before the pedestal can engage the belt and possibly damage the same. Thus, the time between the wearing away to the line 75 and wearing away to the pedestal 76 permits ample warning for replacement of the blades.

Figure 10:
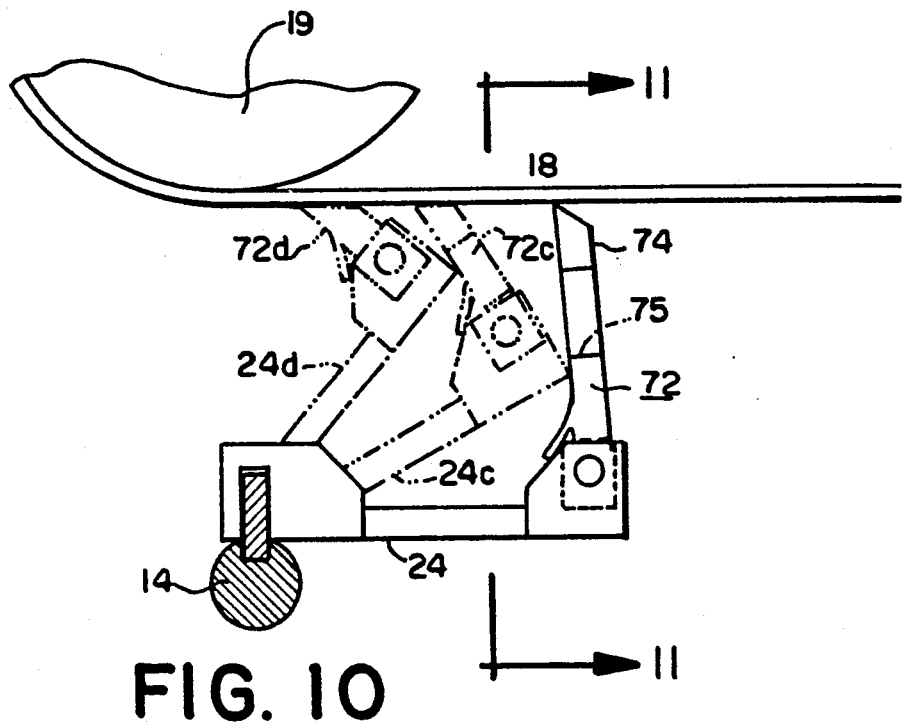
FIG. 10 is a side view of the scraper arm of FIG. 6 showing the blade engaged with the undersurface of a conveyor, the full line representing the position of the blade when it is freshly installed and the broken lines representing selected positions as the blade wears away.

The operation of this embodiment of the invention is illustrated diagrammatically in FIG. 10 wherein the shaft 14 supports the trailing arm 24 to position the blade 72 against the undersurface of the belt 18 as it travels in its normal direction from the head pulley 19. The composition of the blade 72 is such as to permit wearing away of the blade, and as the aligned blades wear through the upper margin 74, the bias on the shaft 14 rotates the arms 24 counterclockwise, for example to the position shown at 24c in broken lines, the wear causing the blade to create a succession of fresh scraping edges 73 as it wears down. The abrasion-resistant particles in the upper marginal portion 74 of the blade retard the wear, when the wear line passes through the upper marginal portion 74, the rate of wear may increase.

Figure 11:
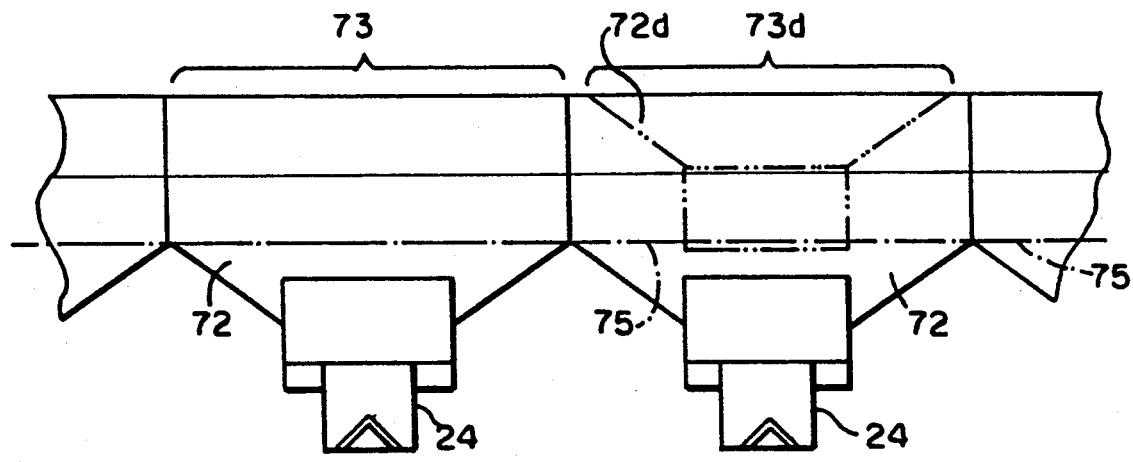
FIG. 11 is a transverse view taken on the line 11—11 of FIG. 10.

In FIG. 10, the position of the arm shown at 24c results from the blade wearing away beyond the upper marginal portion 74. It should be noted that usually the blade wear also causes the blade to tilt rearwardly relative to the arm 24 to maintain a generally perpendicular scraping angle against the belt, so the blade edge illustrated is not representative of actual conditions. Further wear of the blade causes further pivotal movement of the trailing arm 24, for example to position the arm as shown at 24d where the scraping edge is worn beyond the dividing line 75. As shown in FIG. 11, when the scraping edge of the blade 72d is worn away below the dividing line at 75, the width of the scraping edge 23d narrows to corresponds to the narrowing width of the blade. The swath on the conveyor belt 18 cleared by the scraping edge, as indicated at 73d in FIG. 11, is of less width than the swath cleared by the scraping edge 73 prior to its being worn. Thus, when the blades are in endwise contiguous alignment as shown in FIG. 11, and the blade 72d is worn beyond the line 75, the narrower swath leaves a stripe of uncleared material on the belt at both ends of the blade, which becomes apparent to the operator to indicate the need for replacement of the blade. Although it is possible for one blade to wear substantially faster than other blades, normally all of the blades will wear at substantially the same rate so that two adjoining blades both produce swaths of narrower widths which makes the stripe of uncleared belting even more visible.

Thus, the novel blade configuration of FIGS. 6–11 provides a clear indicator of the need to replace worn blades, enabling the blade to be replaced before it is worn all the way down to the mounting block on the trailing arm. By replacing the blade prior to it being worn down to the mounting block, damage to the belt by reason of contact with the mounting block may be avoided, and damage to the mounting block by the belt may be avoided.

While particular embodiments of the present invention have been herein illustrated and described, it is not intended to limit the invention to such disclosure, but changes and modifications may be made therein and thereto within the following claims.

I claim:

1. In a scraper assembly for a conveyor belt normally traveling in one direction but capable of travel in the reverse direction, the assembly including a trailing arm supported at one end adjacent the belt and extending generally in the direction of normal travel of the belt, a scraper blade mounted at the distal end of said trailing arm having a home position disposed at an attack angle to the approaching portion of said belt, and having a scraping edge engaging said belt along a scraping line transverse to said normal direction of travel, and means biasing said trailing arm toward said belt to forcibly engage said scraping edge with said belt along said scraping line, the improvement wherein said assembly includes a stud element releasably mounting said scraper blade on the distal end of said trailing arm, the distal end of said trailing arm having an exposed surface confronting said scraper blade, the scraper blade having abutment means remote from said scraping edge operable to engage said exposed surface, said stud element affording pivotal movement of said blade about a blade axis parallel to said scraping edge, the engagement of said abutment means with said exposed surface being effective to limit said pivotal movement, at least one of said exposed surface and said abutment means being of resilient material to yieldingly resist pivotal movement of said blade away from its home position upon encountering an obstruction on the belt as it travels past the blade, and to return said blade to its home position upon travel of the obstruction beyond the blade.

2. A scraper assembly according to claim 1 wherein said exposed surface and said abutment means have configurations and resiliency affording pivotal movement of said blade in a first direction to allow resilient angular displacement of said scraping edge about said blade axis in the direction of normal travel of the belt in the range of 0°–10°, and in a second direction to allow resilient angular displacement of said scraping edge about said blade axis in a direction corresponding to the reverse direction of travel of the belt in the range of 10°–60°.

3. A scraper assembly according to claim 2 wherein the abutment means of said scraper blade includes a series of knuckles projecting from an edge margin of said scraper blade, said distal end of the trailing arm having complementary knuckles interdigitated with the scraper blade knuckles, said stud element comprising a separate hinge pin passing through said interdigitated knuckles, said arm knuckles having surfaces adapted to engage the edge margin of the scraper blade between said knuckles to limit pivotal displacement of said blade relative to said arm on said hinge pin in the direction of normal travel of the belt.

4. An assembly according to claim 3 wherein the knuckles on said arm have webs bridging said arm knuckles at one side of said blade knuckles, said webs comprising the exposed surface which engages said blade abutment knuckles to yieldingly resist pivotal displacement of said blade in the direction of reverse travel of the belt.

5. For a scraper assembly of a conveyor belt normally traveling in one direction, the assembly including a plurality of arms, each supported at one end adjacent the belt surface and extending generally in the direction of travel of the belt, a stud element adapted to releasably mount a scraper blade on the distal end of each arm, and means biasing said distal end of each arm toward said belt surface, a plurality of scraper blades, one for each arm, each blade having a hollow cylindrical socket for receiving the stud element at the distal end of the arm, and having a leading surface adapted to be normally disposed at an attack angle to the approaching portion of the belt surface to define a scraping edge engaging the belt surface along a scraping line transverse to its direction of travel, said socket having a central axis parallel to said scraping edge and adapted to afford limited pivotal movement of said blade on the stud element about said central axis to vary said attack angle, said edge adapted to be forcibly engaged with the belt surface along said scraping line by the biasing means to cause said blade to clean a longitudinal swath along the travelling belt surface, said swath having a width corresponding to the width of said blade and the transverse extension of said scraping edge, said arms mounting said blades in transverse end-to-end alignment across the belt surface, each belt scraper blade adapted to wear away and form new scraping edges as the blade is displaced toward the belt surface by the biasing means, the width of each blade being uniform in the marginal portion of the blade adjacent said scraping edge and being of decreasing width starting at a predetermined distance from said scraping edge and extending through a second distance, then approaching said socket, whereby the swath cleaned by each blade decreases its width when the blade is worn away past said predetermined distance and into said second distance, the wear condition of the blade being indicated by the width of said swath on the belt surface beyond the scraping line, and the width of the space between the swaths formed by endwise adjacent blades of said plurality of scraper blades.

6. An improved blade according to claim 5 wherein said blade is composed of elastomeric material, said marginal portion of the blade including wear-resistant particles to delay the blade's wearing away.

7. For a scraper assembly of a conveyor belt normally traveling in one direction, the assembly including an arm supported at one end adjacent the belt surface and extending generally in the direction of travel of the belt, a stud element adapted to releasably mount a scraper blade on the distal end of said arm, and means biasing said distal end of said arm toward said belt surface, an improved scraper blade having a socket for receiving the stud element at the distal end of the arm, and having a leading surface adapted to be normally disposed at an attack angle to the approaching portion of the belt surface to define a scraping edge engaging the belt surface along a scraping line transverse to its direction of travel, said edge adapted to be forcibly engaged with the belt surface along said scraping line by the biasing means to cause said blade to clean a longitudinal swath along the travelling belt surface, said swath having a width corresponding to the width of said blade and the transverse extension of said scraping edge, said belt scraper blade adapted to wear away and form new scraping edges as the blade is displaced toward the belt surface by the biasing means, the width of said blade being uniform in the marginal portion of the blade adjacent said scraping edge and being of decreasing width starting at a predetermined distance from said scraping edge and approaching said socket, whereby the swath cleaned by said blade decreases its width when the blade is worn away past said predetermined distance, the wear condition of the blade being indicated by the width of said swath on the belt surface beyond the scraping line, said blade having laterally-spaced knuckles projecting from the base edge of said blade opposite to the scraping edge and remote from said marginal portion, said knuckles having coaxial cylindrical bores therethrough forming said socket for receiving the stud element.

8. A blade according to claim 7 wherein said base edge and said knuckles of the blade are comprised of a resilient elastomeric material to provide a yielding abutment means cooperable with the arm to yieldingly resist pivotal movement of the blade on said stud element and return said blade to its normal disposition with its leading surface at an attack angle to the approaching portion of the belt surface.

9. A blade according to claim 7 including a cover flap projecting away from the scraper surface at said base edge to overlie said spaced knuckles and the spacing therebetween.

10. For a scraper assembly of a conveyor belt normally traveling in one direction, the assembly including an arm supported at one end adjacent the belt surface and extending generally in the direction of travel of the belt, a stud element adapted to releasably mount a scraper blade on the distal end of said arm, and means biasing said distal end of said arm toward said belt surface, an improved scraper blade having a socket for receiving the stud element at the distal end of the arm, and having a leading surface adapted to be normally disposed at an attack angle to the approaching portion of the belt surface to define a scraping edge engaging the belt surface along a scraping line transverse to its direction of travel, said edge adapted to be forcibly engaged with the belt surface along said scraping line by the biasing means to cause said blade to clean a longitudinal swath along the travelling belt surface, said socket being in the form of a hollow cylinder having a central axis parallel to said scraping edge and adapted to afford limited pivotal movement of said blade on the stud element about said central axis to vary said attack angle, said blade having laterally-spaced knuckles projecting from a base edge of said blade opposite to said scraping edge, said knuckles having coaxial cylindrical bores therethrough forming said socket for receiving the stud element, said base edge and said knuckles of the blade being comprised of a resilient elastomeric material to provide a yielding abutment means cooperable with the arm to yieldingly resist pivotal movement of the blade on said stud element and return said blade to its normal disposition with its leading surface at an attack angle to the approaching portion of the belt surface.

11. A scraper assembly for a conveyor belt having an exposed surface normally traveling in one direction but capable of travel in the reverse direction, a trailing arm supported on a support shaft at one end adjacent the belt surface and extending generally in the direction of normal travel of the belt, a scraper blade mounted at the distal end of said trailing arm having a home position disposed at an attack angle to the approaching portion of said belt surface and having a scraping edge engaging said belt surface along a scraping line transverse to said normal direction of travel, the support shaft biasing said trailing arm toward said belt surface to forcibly engage said scraping edge with said belt surface along said scraping line, a blade-mounting block at distal end of said trailing arm having an exposed surface confronting said scraper blade, a stud element releasably mounting said scraper blade in said blade-mounting block, affording pivotal movement of said blade about a blade axis substantially parallel to said scraping edge, the scraper blade having abutment means remote from said scraping edge operable to engage said exposed surface of the blade-mounting block to limit said pivotal movement, at least one of said exposed surface and said abutment being of resilient material to yieldingly resist pivotal movement of said blade away from its home position upon encountering an obstruction on the belt surface as it travels past the blade, and to return said blade to its home position upon travel of the obstruction beyond the blade.

12. A scraper assembly according to claim 11 for use with support shaft positioned below the belt surface, including a hanger at said one end of the trailing arm, said hanger adapted to engage the support shaft to position said arm relative to the belt surface, said hanger having a downwardly-facing channel to loosely engage an upwardly-projecting rib on the support shaft, whereby upon rotation of said shaft to displace said arm in a direction toward said belt surface, said blade forcibly engages said belt surface and said hanger channel is locked to the shaft rib by friction, and upon rotation of the shaft to displace said arm in a direction away from the belt surface, first said blade disengages the belt surface and thereafter said hanger is disengaged from said shaft by gravity.

13. A scraper assembly according to claim 12 wherein said hanger and said blade-mounting block comprise elastomeric material, said arm including a rigid strut interconnecting said hanger and said block, said elastomeric material yieldingly resisting rotation of said block relative to said hanger about an axis parallel to the direction of travel of the belt surface.

14. A scraper assembly according to claim 13 wherein said rigid strut comprises an angle iron having a pair of legs and an angular corner therebetween extending longitudinally thereof and positioned to face upwardly toward said belt surface, so that said legs decline downwardly from said corner.

15. A scraper assembly according to claim 14 including an angular cover complementary to said angle iron and adapted to snap into place on top of said angle member, said cover extending from said hanger to said blade-mounting block to protect said angle iron from material dropping from the belt surface at said scraping line.

16. A scraper assembly according to claim 13 wherein said hanger comprises a pair of rigid inserts in said channel, each insert being spaced inwardly from the ends of said channel to slidably engage the upwardly projecting rib on the support shaft to afford adjustment of said hanger along the length of the shaft, said rigid strut being positioned between said inserts and spaced therefrom by the elastomeric material of said hanger.

17. A scraper assembly according to claim 11 wherein said exposed surface and said abutment means have configurations and resiliency affording pivotal movement of said blade in a first direction to allow resilient angular displacement of said scraper blade about said blade axis in the direction of normal travel of the belt surface in the range of 0°–10°, and in a second direction to allow resilient angular displacement of said scraper blade about said blade axis in a direction corresponding to the reverse direction of travel of the belt surface in the range of 10°–60°.

18. A scraper assembly according to claim 17 wherein the abutment means of said scraper blade includes a series of knuckles projecting from a base edge of said scraper blade opposite to said scraping edge, said block at the distal end of the trailing arm having complementary knuckles interdigitated with the scraper blade knuckles, said stud element comprising a separate hinge pin passing through said interdigitated knuckles, the exposed surfaces of said block knuckles adapted to engage the base edge of the scraper blade between said blade knuckles to limit pivotal displacement of said blade relative to said arm on said hinge pin in the direction of normal travel of the belt surface.

19. An assembly according to claim 18 wherein the knuckles of said block have webs bridging said block knuckles at one side of said blade knuckles, said webs comprising the exposed surface which engages said blade abutment knuckles to yieldingly resist pivotal displacement of said blade in the direction of reverse travel of the belt surface.

20. A blade according to claim 19 wherein said base edge and said knuckles of the blade are comprised of a resilient elastomeric material to provide yielding abutment means cooperable with the block to yieldingly resist pivotal movement of the blade on said stud element and to return said blade to its normal disposition with its leading surface at an attack angle to the approaching portion of the belt surface.

21. A blade according to claim 19 including a cover flap projecting away from the leading surface of the base edge of said blade to overlie said spaced knuckles of the block and of the blade.

* * * * *